(12) United States Patent
Xie et al.

(10) Patent No.: US 10,502,359 B2
(45) Date of Patent: Dec. 10, 2019

(54) CARRYING DEVICE

(71) Applicants: BOE Technology Group Co., Ltd., Beijing (CN); Hefei Xinsheng Optoelectronics Technology Co., Ltd., Anhui (CN)

(72) Inventors: Fei Xie, Beijing (CN); Yuerong Ji, Beijing (CN); Xudong Liu, Beijing (CN); Jun Cai, Beijing (CN); Cheng Wang, Beijing (CN); Han Chen, Beijing (CN); Bin Wan, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/954,667

(22) Filed: Apr. 17, 2018

(65) Prior Publication Data
US 2019/0032840 A1 Jan. 31, 2019

(30) Foreign Application Priority Data
Jul. 25, 2017 (CN) .................... 2017 2 0906175 U

(51) Int. Cl.
*F16M 13/00* (2006.01)
*F16M 11/22* (2006.01)
*F16M 11/04* (2006.01)

(52) U.S. Cl.
CPC .............. *F16M 11/22* (2013.01); *F16M 11/04* (2013.01)

(58) Field of Classification Search
CPC ..... H05K 13/0069; B23K 3/0676; B25H 7/00
See application file for complete search history.

(56) References Cited

U.S. PATENT DOCUMENTS

| | | | | |
|---|---|---|---|---|
| 4,707,925 A | * | 11/1987 | Englehart | ................ B25H 7/00 269/905 |
| 5,067,648 A | * | 11/1991 | Cascini | ................ B23K 3/0676 118/503 |
| 6,667,630 B2 | * | 12/2003 | Abdulky | ............ G01R 31/2808 324/754.03 |
| 2004/0090747 A1 | * | 5/2004 | Wang | ................ H05K 13/0069 361/719 |

* cited by examiner

*Primary Examiner* — Amy J. Sterling
(74) *Attorney, Agent, or Firm* — Nath, Goldberg & Meyer; Joshua B. Goldberg

(57) ABSTRACT

The present disclosure provides a carrying device comprising: a supporting platform; a plurality of supporting strips disposed along at least two edges of an upper surface of the supporting platform, and at least one of the supporting strips being capable of moving on the supporting platform; and a first moving assembly that includes a first guide rail, a second guide rail and a first sliding block capable of sliding on the first and second guide rails, and the first and second guide rails being disposed parallelly on the upper surface of the supporting platform. The plurality of supporting strips include a first supporting strip having a side wall connected to a side wall of the first sliding block, and the first moving assembly is configured to drive moving of the first supporting strip.

13 Claims, 3 Drawing Sheets

CARRYING DEVICE

CROSS-REFERENCE TO RELATED APPLICATION

This application claims the priority of Chinese Patent Application No. 201720906175.8 submitted to the Chinese Intellectual Property Office on Jul. 25, 2017, the present disclosure of which is incorporated herein in its entirety by reference.

TECHNICAL FIELD

The present disclosure relates to the technical field of device manufacturing, and particularly relates to a carrying device.

BACKGROUND OF THE INVENTION

In process of manufacturing a display panel, an operator needs to manually inspect, wipe or remove its protective film thereon. During the above process, the operator places the display panel directly on an operating floor. Since the operating floor has a larger area in contact with the display panel, it is more likely to result in scratches on the display panel in the operating process. Moreover, since the display panel isn't fixed, it is more likely to produce breakage of the display panel in the operating process.

SUMMARY

The present disclosure has been accomplished in order to at least partially solve the problems in the prior art. The present disclosure provides a carrying device which can reduce scratches and breakage produced on the display panel and adapted to display panel with different sizes.

According to one aspect of the present disclosure, there is provided a carrying device comprising:

a supporting platform;

a plurality of supporting strips disposed along at least two edges of an upper surface of the supporting platform, and at least one of the supporting strips being capable of moving on the supporting platform; and a first moving assembly that includes a first guide rail, a second guide rail and a first sliding block capable of sliding on the first and second guide rails, and the first and second guide rails being disposed parallelly on the upper surface of the supporting platform, the plurality of supporting strips include a first supporting strip having a side wall connected to a side wall of the first sliding block, and the first moving assembly is configured to drive moving of the first supporting strip.

The carrying device may further include:

a second moving assembly that includes a third guide rail, a fourth guide rail and a second sliding block capable of sliding on the third and fourth guide rails, and the third and fourth guide rails is disposed parallelly on the upper surface of the supporting platform, the plurality of supporting strips include a second supporting strip having a side wall connected to a side wall of the second sliding block, the second supporting strip and the first supporting strip are disposed respectively along two adjacent edges of the upper surface of the supporting platform, and the second moving assembly is configured to drive moving of the second supporting strip.

An upper surface of the first supporting strip and an upper surface of the first sliding block may form a first step, and an upper surface of the second supporting strip and an upper surface of the second sliding block may form a second step.

The upper surface of the first supporting strip may be in the same plane as the upper surface of the second supporting strip, and be lower than the upper surfaces of the first and second sliding blocks.

The carrying device may further include:

a first fixed part configured to connect with one end of the first sliding block so as to fix the first sliding block in a position on the first and second guide rails, and a second fixed part configured to connect with one end of the second sliding block so as to fix the second sliding block in a position on the third and fourth guide rails.

The carrying device may further include:

a plurality of filling strips, and an upper surface of each of the filling strips is in the same plane as an upper surface of a corresponding supporting strip in the plurality of supporting strips, and the filling strips and the supporting strips corresponding to each other are detachably connected.

The upper surface of the supporting platform may be provided with a first opening; the plurality of supporting strips may further include other supporting strips; the first supporting strip, the second supporting strips and other supporting strips are arranged in series to form a second opening; the second opening is located within an area of the first opening.

The carrying device may further include:

a supporting block that is disposed at a bottom of the supporting platform and is located inside the second opening; an upper surface of the supporting block is located in the same plane as upper surfaces of the plurality of supporting strips.

The upper surfaces of the plurality of supporting strips and the upper surface of the supporting block may be inclined surfaces.

The inclined surfaces may have an included angle of about 20° to 30° with respect to a horizontal plane.

The bottom of the supporting platform may be provided with a plurality of positioning holes configured to be detachably connected to the supporting block.

The bottom of the supporting platform may be provided with guide rail along which the supporting block can slide.

The carrying device may further include:

a sucking assembly that includes a plurality of suction cups, an air pipe and a vacuum pump, the plurality of suction cups are located on the surfaces of the plurality of supporting strips respectively, and connected to an extraction opening of the vacuum pump via the air pipe.

A first groove and a second groove may be formed at the bottom of the supporting platform; the first groove is parallel to the first and second guide rails and configured to accommodate an air pipe connected to a suction cup on the first supporting strip; the second groove is parallel to the third and fourth guide rails and configured to accommodate an air pipe connected to a suction cup on the second supporting strip.

DETAILED DESCRIPTION

To improve understanding of the technical solution of the present disclosure for those skilled in the art, a carrying device provided by the present disclosure will be described in detail in conjunction with the accompanying drawings.

Figure 1:
FIG. 1 is a schematic view showing a configuration of an existing carrying device.

FIG. 1 is a schematic view showing a configuration of an existing carrying device. As shown in FIG. 1, the carrying device includes a plurality of supporting strips 2, and each of the supporting strips 2 is used for carrying an edge of a display panel respectively. However, each supporting strip 2 has a fixed position and size, thus such kind of carrying device can only be adapted to display panel with one size. As for display panels having different sizes, it needs to purchase carrying devices having different sizes, thereby resulting in higher production costs, and more carrying devices further needs extra purchasing of storage rack for storing the carrying devices, which further increases the production costs.

Figure 2:
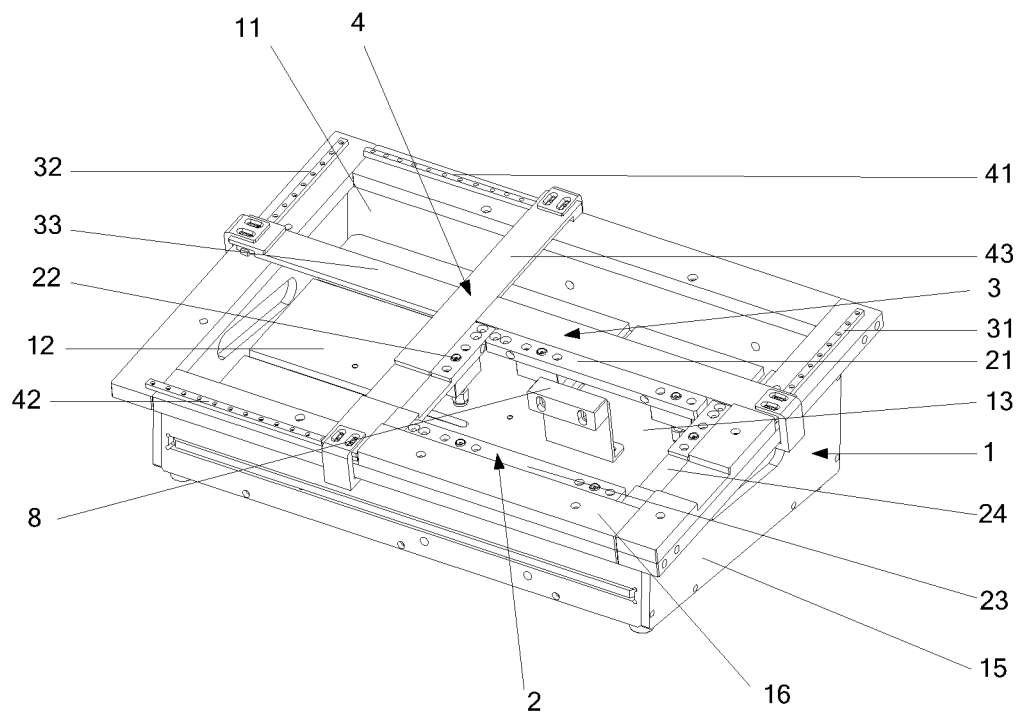
FIG. 2 is a perspective view showing a carrying device according to an exemplary embodiment of the present disclosure.
Figure 3:
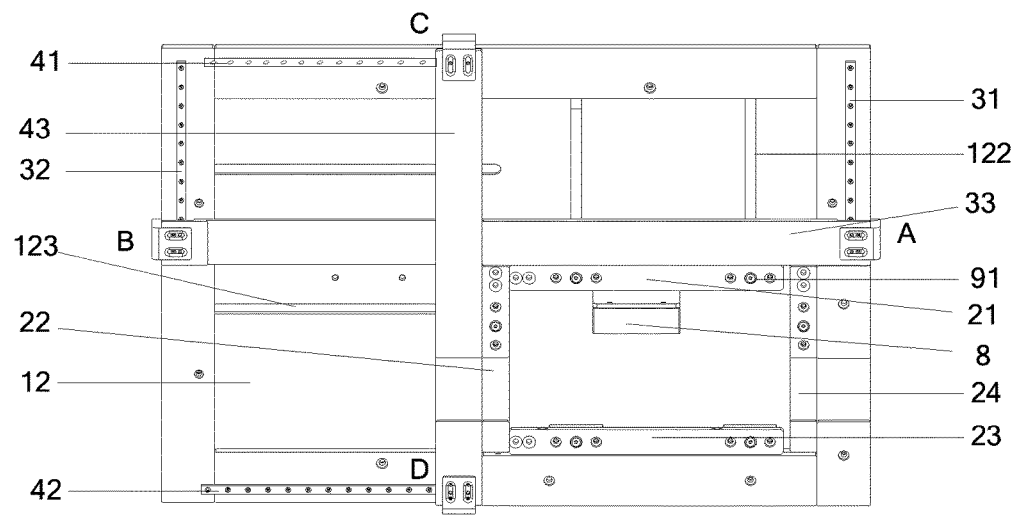
FIG. 3 is a plan view showing the carrying device according to the exemplary embodiment of the present disclosure.

FIG. 2 is a perspective view showing a carrying device according to an exemplary embodiment of the present disclosure, FIG. 3 is a plan view showing the carrying device according to the exemplary embodiment of the present disclosure. As shown in FIGS. 2 and 3, the carrying device according to the exemplary embodiment of the present disclosure includes a supporting platform 1 and supporting strips 2, and the supporting platform 1 has a stereostructure constituted by a bottom, a top and a side 15. In the exemplary embodiment of the present disclosure, a top surface of the bottom (hereinafter referred to as "a lower surface of the supporting platform 1") is denoted with a reference sign "12", a top surface of the top (hereinafter referred to as "an upper surface of the supporting platform 1") is denoted with a reference sign "16". The supporting strips 2 are disposed along at least two edges of an upper surface 16 of the supporting platform 1, and at least one supporting strip 2 is capable of moving on the supporting platform 1.

The supporting strips 2 are configured to carry goods to be carried. The exemplary embodiment of the present disclosure is described by taking a display panel being goods to be carried as an example, though the goods to be carried can also be sheet materials such as a touch screen, a glass substrate or backlight module etc. Since the display panel generally has a rectangular shape, the lower surface 12 and the upper surface 16 in the embodiment of the present disclosure also have a rectangular shape, and the supporting strips 2 are disposed along at least two edges of the rectangular upper surface 16 accordingly, so as to carry the edge of the display panel respectively.

Regarding the carrying device according to the exemplary embodiment of the present disclosure, since at least one of the supporting strips 2 is capable of moving on the supporting platform 1, it can adjust the position of supporting strips 2 according to different sizes of the display panels, so that the supporting strips 2 in different positions can carry the edge of display panels with different sizes. In this case, one carrying device can carry display panels with different sizes. Therefore, there is no need to purchase more carrying devices, thereby reducing production costs. Accordingly, there is no need to purchase more storage rack for storing the carrying devices, which further reduces the production costs.

As shown in FIGS. 2 and 3, in the exemplary embodiment of the present disclosure, the supporting strips 2 include a first supporting strip 21, a second supporting strip 22, a third supporting strip 23 and a fourth supporting strip 24; the first supporting strip 21 is disposed adjacent to the second supporting strip 22; the third supporting strip 23 is disposed opposite to the first supporting strip 21; the fourth supporting strip 24 is disposed opposite to the second supporting strip 22. The carrying device further includes a first moving assembly 3 which includes a first guide rail 31, a second guide rail 32 and a first sliding block 33; the first guide rail 31 and the second guide rail 32 are disposed parallelly on the upper surface 16 of the supporting platform 1; the first sliding block 33 has two ends which are capable of sliding on the first guide rail 31 and the second guide rail 32 respectively; the first supporting strip 21 has a side wall connected to a side wall of the first sliding block 33, and the first moving assembly 3 is configured to drive moving of the first supporting strip 21.

In the exemplary embodiment of the present disclosure, the first supporting strip 21 extends along a length direction of the supporting platform 1; accordingly, the first guide rail 31 and the second guide rail 32 are disposed on the upper surface 16 of the supporting platform 1 along a width direction of the supporting platform 1. When sliding on the first guide rail 31 and the second guide rail 32, the first sliding block 33 can drive the first supporting strip 21 connected thereto to move along the width direction of the supporting platform 1. The third supporting strip 23 can be fixedly connected to the upper surface 16, and the first supporting strip 21 can cooperate with the third supporting strip 23 to carry the display panels with different widths.

In the exemplary embodiment of the present disclosure, as shown in FIGS. 2 and 3, the carrying device further includes a second moving assembly 4 which includes a third guide rail 41, a fourth guide rail 42 and a second sliding block 43; the third guide rail 41 and the fourth guide rail 42 are disposed parallelly on the upper surface 16 of the supporting platform 1; the second sliding block 43 has two ends which are capable of sliding on the third guide rail 41 and the fourth guide rail 42 respectively; the second supporting strip 22 has a side wall connected to a side wall of the second sliding block 43, and the second moving assembly 4 is configured to drive moving of the second supporting strip 22.

In the exemplary embodiment of the present disclosure, the second supporting strip 22 extends along a width direction of the supporting platform 1; accordingly, the third guide rail 41 and the fourth guide rail 42 are disposed on the upper surface 16 of the supporting platform 1 along the length direction of the supporting platform 1. When sliding on the third guide rail 41 and the fourth guide rail 42, the second sliding block 43 can drive the second supporting strip 22 connected thereto to move along the length direction of the supporting platform 1. The fourth supporting strip 24 can be fixedly connected to the upper surface 16, and the second supporting strip 22 can cooperate with the fourth supporting strip 24 to carry the display panels with different lengths.

The position of the first supporting strip 21 can be adjusted in the width direction of the supporting platform 1 by use of the first moving assembly 3, i.e. to adjust the width of display panel carried by the first supporting strip 21 and the third supporting strip 23; in the meantime, the position of the second supporting strip 22 can be adjusted in the length direction of the supporting platform 1 by use of the second moving assembly 4, i.e. to adjust the length of display panel carried by the second supporting strip 22 and the fourth supporting strip 24, so that the supporting platform 1 is capable of carrying display panels with different sizes.

It should be noted that the exemplary embodiment of the present disclosure is described by taking the first guide rail 31, the second guide rail 32, the third guide rail 41 and the fourth guide rail 42 provided on the upper surface 16 of the supporting platform 1 as an example. Certainly, a person skilled in the art knows well that it is also possible to dispose the first guide rail 31, the second guide rail 32, the third guide rail 41 and the fourth guide rail 42 on the side 15 of the supporting platform 1 as long as it is assured that the first sliding block 33 can move in the width direction of the supporting platform 1, and the second sliding block 43 can move in the length direction of the supporting platform 1.

In the exemplary embodiment of the present disclosure, an upper surface of the first supporting strip 21 and an upper surface of the first sliding block 33 form a first step; an upper surface of the second supporting strip 22 and an upper surface of the second sliding block 43 form a second step; an upper surface of the third supporting strip 23 and the upper surface 16 of the supporting platform 1 form a third step; an upper surface of the fourth supporting strip 24 and the upper surface 16 of the supporting platform 1 form a fourth step. In this case, when the supporting platform 1 carries the display panel, the first step, the second step, the third step and the fourth step can abut on four edges of the display panel respectively so as to hold the display panel so that the display panel is fixed on the supporting platform 1. It should be understood that the upper surface of the first supporting strip 21, the upper surface of the second supporting strip 22, the upper surface of the third supporting strip 23 and the upper surface of the fourth supporting strip 24 are located in a same plane, and are lower than the upper surfaces of the first and second sliding blocks 33, 43 and the upper surface 16 of the supporting platform 1 as well.

It should be noted that the exemplary embodiment of the present disclosure is illustrated based on the example of four supporting strips 2. A person skilled in the art knows well that two supporting strips 2 may also be allowed. When there are two supporting strips 2, the two supporting strips 2 can be disposed along two opposed edges of the upper surface 16 of the supporting platform 1, or two adjacent edges of the upper surface 16 of the supporting platform 1. Either of the two supporting strips 2 can be driven by the moving assembly to move on the supporting platform 1, or both of the two supporting strips 2 can be driven by two moving assemblies respectively to move on the supporting platform 1; a spacing between the two supporting strips 2 can be adjusted by the moving assemblies so as to carry the display panels with different sizes. Certainly, three supporting strips 2 may also be allowed. When there are three supporting strips 2, the three supporting strips 2 can be disposed along three edges of the upper surface 16 of the supporting platform 1 respectively; one of the three supporting strips 2 can be driven by the moving assembly to move on the supporting platform 1, or two of the three supporting strips 2 can be driven by two moving assemblies respectively to move on the supporting platform 1; an area of the region surrounded by the three supporting strips 2 can be adjusted by the moving assemblies so as to carry the display panels with different sizes.

Figure 5:
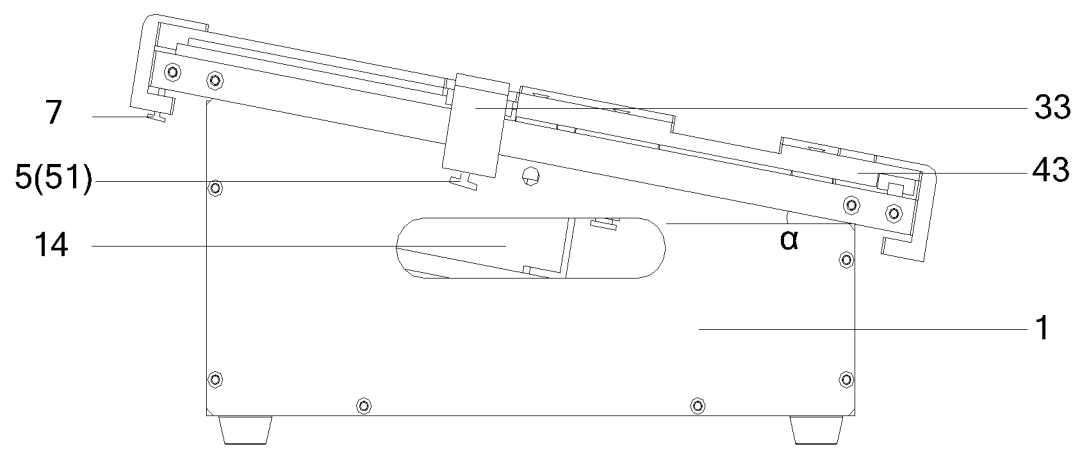
FIG. 5 is a side view showing the carrying device according to the exemplary embodiment of the present disclosure.

FIG. 5 is a side view showing the carrying device according to the exemplary embodiment of the present disclosure. As shown in FIGS. 2 and 5, the carrying device may further include a first fixed part 5 configured to connect with one end of the first sliding block 33 so as to fix the first sliding block 33 in a position on the first guide rail 31 and the second guide rail 32, and/or a second fixed part 7 configured to connect with one end of the second sliding block 43 so as to fix the second sliding block 43 in a position on the third guide rail 41 and the fourth guide rail 42.

In the exemplary embodiment of the present disclosure, after the first sliding block 33 drives the first supporting strip 21 to move to a pre-determined position, the first sliding block 33 can be fixed on the first guide rail 31 and the second guide rail 32 by use of the first fixed part 5, so as to fix a position of the first supporting strip 21, and assure that the first and third steps can abut on the edges of display panel. After the second sliding block 43 drives the second supporting strip 22 to move to a pre-determined position, the second sliding block 43 can be fixed on the third guide rail 41 and the fourth guide rail 42 by use of the first fixed part 7, so as to fix a position of the second supporting strip 22, and assure that the second and fourth steps can abut on the edges of display panel.

In the exemplary embodiment of the present disclosure, the carrying device may include both the first fixed part 5 and the second fixed part 7; in this case, it can fix positions of the first supporting strip 21 and the second supporting strip 22 respectively, so as to assure that the display panel is fixed on the carrying device stably.

As shown in FIG. 5, the first fixed part 5 may include a fastener 51, which may be a screw. When the fastener 51 is a screw, a first end of the first sliding block 33 may be provided with a through-hole in which an internal thread is disposed, and an external thread is disposed on the fastener 51. In this case, when the fastener 51 is tightened, one end of the fastener 51 can penetrate the through-hole, and abutting on the surface of the supporting platform 1, so as to fix the first sliding block 33 on the first guide rail 31 and the second guide rail 32; when the fastener 51 is loosened, the fastener 51 is not in contact with the surface of the supporting platform 1, that is, it will not affect the movement of the first sliding block 33 on the first guide rail 31 and the second guide rail 32.

Since the second fixed part 7 may have the same structure as the first fixed part 5, it will not be repeated herein.

As shown in FIG. 3, the first supporting strip 21 is connected to the second supporting strip 22 and the fourth supporting strip 24 when one end of the first sliding block 33 is located at a start position A on the first guide rail 31, and another end thereof is located at a start position B on the second guide rail 32. The second supporting strip 22 is connected to the first supporting strip 21 and the third supporting strip 23 when one end of the second sliding block 43 is located at a start position C on the third guide rail 41, and another end thereof is located at a start position D on the fourth guide rail 42. The size of display panel carried by the first supporting strip 21, the second supporting strip 22, the third supporting strip 23 and the fourth supporting strip 24 is minimum when both ends of the first sliding block 33 and both ends of the second sliding block 43 are located at the start positions.

Figure 4:
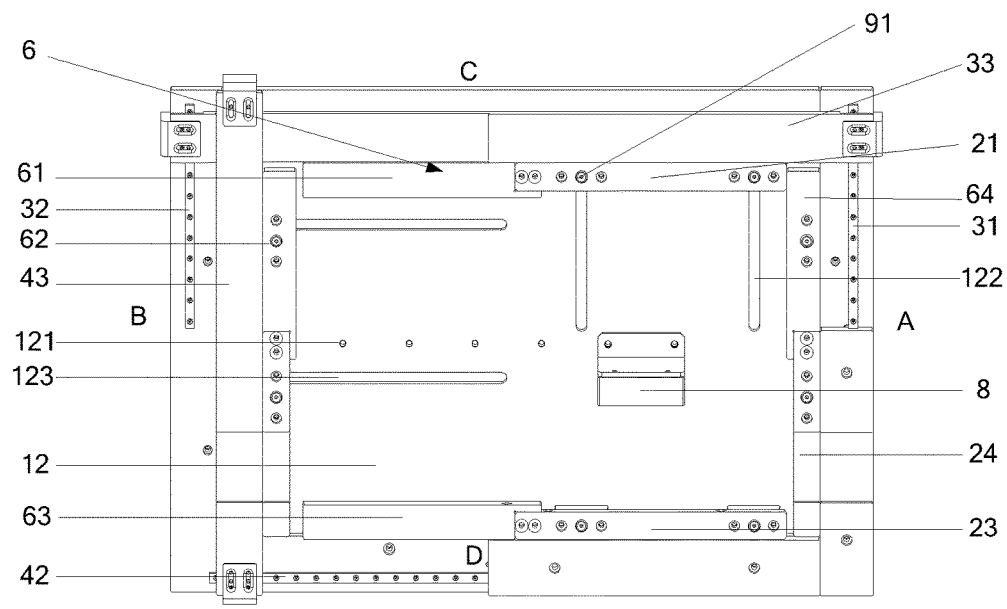
FIG. 4 is another plan view showing the carrying device according to the exemplary embodiment of the present disclosure.

FIG. 4 is another plan view showing the carrying device according to the exemplary embodiment of the present disclosure. As shown in FIG. 4, when the first sliding block 33 is not located at the start positions on the first guide rail 31 and the second guide rail 32, the first supporting strip 21 is spaced from the second supporting strip 22 and the fourth supporting strip 24 in the width direction of the supporting platform 1. When the second sliding block 43 is not located at the start positions on the third guide rail 41 and the fourth guide rail 42, the second supporting strip 22 is spaced from the first supporting strip 21 and the third supporting strip 23 in the length direction of the supporting platform 1. The size of display panel carried by the supporting strips 2 becomes large when the first supporting strip 21 is spaced from the second supporting strip 22 and the fourth supporting strip 24 in the width direction of the supporting platform 1, and the second supporting strip 22 is spaced from the first supporting strip 21 and the third supporting strip 23 in the length direction of the supporting platform 1. However, the edge of the display panel with a larger size has a greater length than the corresponding supporting strip 2, thus it results in the supporting strips 2 being only capable of partially carrying edges of the display panel, which further results in a larger deformation amount of the display panel, so that the display panel is more likely to be broken in the follow-up process of inspecting, wiping or removing its protective film thereon.

In order to solve the problem of breakage of display panel, as shown in FIG. 4, the carrying device may further include filling strips 6, and upper surfaces of the filling strips 6 are in the same plane as the upper surface of the supporting strips 2, and the filling strips 6 are detachably connected to the supporting strips 2. Specifically, the filling strips 6 include a first filling strip 61, a second filling strip 62, a third filling strip 63 and a fourth filling strip 64; when the first supporting strip 21 is spaced from the second supporting strip 22 and the fourth supporting strip 24 in the width direction of the supporting platform 1, the second filling strip 62 and the fourth filling strip 64 can be disposed along the width direction of the supporting platform 1, and the fourth filling strip 64 is detachably connected to the fourth supporting strip 24, the second filling strip 62 is detachably connected to the second supporting strip 22. When the second supporting strip 22 is spaced from the first supporting strip 21 and the third supporting strip 23 in the length direction of the supporting platform 1, the first filling strip 61 and the third filling strip 63 can be disposed along the length direction of the supporting platform 1, and the first filling strip 61 is detachably connected to the first supporting strip 21, the third filling strip 63 is detachably connected to the third supporting strip 23. The supporting strips 2 can support the edge of display panel together with the filling strips 6, so as to reduce the deformation amount of display panel.

In the exemplary embodiment of the present disclosure, a length of the second filling strip 62 and the fourth filling strip 64 is equal to a spacing between the first supporting strip 21 and the second supporting strip 22 and the fourth supporting strip 24 in the width direction of the supporting platform 1, and a length of the first filling strip 61 and the third filling strip 63 is equal to a spacing between the second supporting strip 22 and the first supporting strip 21 and the third supporting strip 23 in the length direction of the supporting platform 1; in this case, the supporting strips 2 cooperates with the filling strips 6, so as to fully support the edges of display panel, thereby better reducing the deformation amount of display panel.

It should be noted that the lengths of the second filling strip 62 and the fourth filling strip 64 are determined based on a position of the first sliding block 33 on the first guide rail 31 and the second guide rail 32. The lengths of the second filling strip 62 and the fourth filling strip 64 depend on the position of the first sliding block 33 on the first guide rail 31 and the second guide rail 32. The lengths of the first filling strip 61 and the third filling strip 63 are determined based on a position of the second sliding block 43 on the third guide rail 41 and the fourth guide rail 42. The lengths of the first filling strip 61 and the third filling strip 63 depend on the position of the second sliding block 43 on the third guide rail 41 and the fourth guide rail 42. It should be understood that the filling strips 6 can be detachably connected to the supporting strips 2 in any suitable connection manner such as screw connection, magnetic connection (which is convenient and easy for disassembling) and the like, as long as it is assured that the filling strips 6 are stably connected, and the upper surfaces of the filling strips 6 are in the same plane as the upper surfaces of the supporting strips 2.

The inventor discovers that when the size of display panel is greater than or equal to 15.6 inches, or the thickness of display panel is less than or equal to 0.7 mm, the deformation amount of display panel in the intermediate position is larger in the case of the display panel being carried by the carrying device. Therefore, the display panel has a higher breakage rate of even reaching 0.3% in the follow-up process of inspecting, wiping or removing its protective film thereon, which greatly affects the yield of display panel. In order to solve the problem of breakage of display panel, the following structure is provided. As shown in FIGS. 2 and 4, the upper surface 16 of the supporting platform 1 is provided with a first opening 11; the supporting strips 2 are arranged in series to form a second opening 13 which is located within an area of the first opening 11. The carrying device may further include a supporting block 8 which is disposed on the lower surface 12 (or the bottom) of the supporting platform 1 and located inside the second opening 13; an upper surface of the supporting block 8 is located in the same plane as the upper surfaces of the supporting strips 2. Specifically, the first supporting strip 21, the second supporting strip 22, the third supporting strip 23 and the fourth supporting strip 24 are disposed along four edges of the first opening 11 respectively; the first supporting strip 21, the second supporting strip 22, the third supporting strip 23 and the fourth supporting strip 24 are arranged in series to form the second opening 13 with different sizes. The upper surface of the supporting block 8 is located in the same plane as the upper surfaces of the supporting strips 2. When the edges of display panel are carried by the supporting strips 2, the supporting block 8 can support the display panel in the intermediate position, so as to reduce the deformation amount of display panel in the intermediate position, and prevent the damage of display panel occurred in the process of inspecting, wiping or removing its protective film thereon.

In the exemplary embodiment of the present disclosure, as shown in FIG. 4, the lower surface 12 of the supporting platform 1 is provided with a plurality of positioning holes 121, and the supporting block 8 is detachably connected to the positioning holes 121 of the lower surface 12; in this case, the supporting block 8 can be disposed on the positioning holes 121 in different positions to adjust a position of the supporting block 8 in the first opening 11, so that the supporting block 8 can always support the display panel in the intermediate position by means of the positioning holes 121 when the display panels with different sizes are carried by the supporting strips 2. In another exemplary embodiment of the present disclosure, the lower surface 12 of the supporting platform 1 is provided with a guide rail along which the supporting block 8 can slide. In this way, the supporting block 8 can be easily and quickly arranged in place.

The exemplary embodiment of the present disclosure is illustrated based on the example of the supporting block 8 having a Z-shape, and such a Z-shaped supporting block 8 is simple in structure, and easy for disassembling.

As shown in FIG. 5, the upper surface 16 of the supporting platform 1 may be an inclined surface, and the plane on which the first opening 11 is located may also be an inclined surface. Accordingly, the plane on which the supporting strips 2 corresponding to the first opening 11 are located may also be an inclined surface. In this case, when the display panel is carried by the supporting strips 2, the display panel may have an included angle α with respect to a horizontal plane, so that the inclined display panel can facilitate the inspecting and wiping of display panel by an operator.

It should be noted that when the plane on which the supporting strips 2 are located is an inclined surface, the supper surface of the supporting block 8 is also an inclined surface; in this case, the supporting block 8 has a larger area in contact with the display panel, which can better improve the supporting effect of the supporting block 8 on the display panel. In the exemplary embodiment of the present disclosure, the lower surface 12 (i.e. a top surface of the bottom) of the supporting platform 1 is an inclined surface parallel to the plane in which the supporting strips 2 are located, in this case, it only needs the supporting block 8 with one size to support the display panels with various sizes in the intermediate position.

In the exemplary embodiment of the present disclosure, the upper surface 16 of the supporting platform 1 has an included angle α of about 20° to 30° with respect to a horizontal plane. Within the above range of included angle α, if there are appearance defects on the display panel, the appearance defects can be clearly displayed, thereby improving the detection rate of appearance defects on the display panel, and reducing the loss detecting rate and misjudgment rate of appearance defects as well. In order to further improve the detection rate of appearance defects on the display panel, the color of the lower surface 12 of the supporting platform 1 may be set to black, so as to increase the contrast degree between the display panel and the lower surface 12 of the supporting platform 1.

It should be noted that an operator needs pressing the display panel while tearing-off the protective film in the process of removing the protective film adhered to the display panel by hands, which results in a longer operating time, and affects production capacity. In order to reduce the operating time of removing the protective film, as shown in FIGS. 2 and 3, the carrying device may further include a sucking assembly for fixing the edges of display panel by a sucking method. The sucking assembly includes suction cups 91, an air pipe and a vacuum pump; the suction cups 91 are disposed on the surfaces of the supporting strips 2; the air pipe has one end connected to the suction cups 91 and another end connected to an extraction opening of the vacuum pump.

In the exemplary embodiment of the present disclosure, the edges of display panel may cover the suction cups 91. When the vacuum pump works, it can produce a negative pressure in the air pipe, and the suction cups 91 can suck the display panel by use of the negative pressure to fix the display panel stably on the supporting platform 1, so that an operator does not need pressing the display panel in the process of removing the protective film adhered to the display panel by hands, thereby greatly reducing the operating time and improving the production capacity. Moreover, it can also avoid collision occurred between the display panel and the step in the process of wiping display panel.

In the exemplary embodiment of the present disclosure, the suction cups 91 are evenly disposed on the surfaces of the supporting strips 2, thereby sucking the edge of display panel evenly to fix the display panel on the supporting platform 1 stably.

It should be noted that the suction cups 91 may also be disposed on the upper surfaces of the filling strips 6.

As shown in FIG. 3, a first groove 122 and/or a second groove 123 are disposed in the first opening 11 of the supporting platform 1. The first groove 122 is parallel to the first and second guide rails 31, 32 and configured to accommodate an air pipe connected to the suction cups 91 on the first supporting strip 21. The second groove 123 is parallel to the third and fourth guide rails 41, 42 and configured to accommodate an air pipe connected to the suction cups 91 on the second supporting strip 22.

In the exemplary embodiment of the present disclosure, the first groove 122 and the second groove 123 are disposed on the lower surface 12 of the supporting platform 1; the first groove 122 is disposed in the same direction as the first and second guide rails 31, 32; the second groove 123 is disposed in the same direction as the third and fourth guide rails 41, 42. When the first sliding block 33 moves on the first and second guide rails 31, 32, the air pipe connected to the suction cups 91 on the first supporting strip 21 can move inside the first groove 122. When the second sliding block 43 moves on the third and fourth guide rails 41, 42, the air pipe connected to the suction cups 91 on the second supporting strip 22 can move inside the second groove 123. The first groove 122 and the second groove 123 play a guiding role for the air pipe, which facilitates the movement of the air pipe together with the first sliding block 33 and the second sliding block 43.

It should be noted that the carrying device may further include a vacuum switch, which is disposed on the supporting platform 1 and configured to control turn-on/turn-off of the vacuum pump, so as to control whether the suction cups 91 suck the edge of display panel.

In the exemplary embodiment of the present disclosure, as shown in FIG. 5, the two opposed sides 15 of the supporting platform 1 are provided with a through-hole 14 respectively; in this case, when moving the supporting platform 1, it is easy for an operator to grasp the through-hole 14, so as to facilitate carrying of the supporting platform 1.

It should be understood the above embodiments are merely exemplary embodiments for the purpose of illustrating the principle of the present disclosure, and the present disclosure is not limited thereto. Various modifications and improvements can be made by a person having ordinary skill in the art without departing from the spirit and essence of the present disclosure. Accordingly, all of the modifications and improvements also fall into the protection scope of the present disclosure.

What is claimed is:
1. A carrying device comprising:
a supporting platform;
a plurality of supporting strips disposed along at least two edges of an upper surface of the supporting platform, and at least one of the supporting strips being capable of moving on the supporting platform;
a first moving assembly that includes a first guide rail, a second guide rail and a first sliding block capable of sliding on the first and second guide rails, and the first and second guide rails being disposed parallelly on the upper surface of the supporting platform; and
a sucking assembly that includes a plurality of suction cups, an air pipe and a vacuum pump, the plurality of suction cups being located on surfaces of the plurality of supporting strips respectively, and connected to an extraction opening of the vacuum pump via the air pipe, wherein the plurality of supporting strips include a first supporting strip having a side wall connected to a side wall of the first sliding block, and the first moving assembly is configured to drive moving of the first supporting strip.

2. The carrying device of claim 1, further comprising:
a second moving assembly that includes a third guide rail, a fourth guide rail and a second sliding block capable of sliding on the third and fourth guide rails, and the third and fourth guide rails being disposed parallelly on the upper surface of the supporting platform, wherein the plurality of supporting strips further include a second supporting strip having a side wall connected to a side wall of the second sliding block, the second supporting strip and the first supporting strip are disposed respectively along two adjacent edges of the upper surface of the supporting platform, and the second moving assembly is configured to drive moving of the second supporting strip.

3. The carrying device of claim 2,
wherein an upper surface of the first supporting strip and an upper surface of the first sliding block forms a first step, and an upper surface of the second supporting strip and an upper surface of the second sliding block forms a second step.

4. The carrying device of claim 3,
wherein the upper surface of the first supporting strip is located in the same plane as the upper surface of the second supporting strip, and is lower than the upper surfaces of the first and second sliding blocks.

5. The carrying device of claim 2, further comprising:
a first fixed part configured to connect with one end of the first sliding block so as to fix the first sliding block in a position on the first and second guide rails, and a second fixed part configured to connect with one end of the second sliding block so as to fix the second sliding block in a position on the third and fourth guide rails.

6. The carrying device of claim 4, further comprising:
a plurality of filling strips, an upper surface of each of the filling strips is located in the same plane as an upper surface of corresponding supporting strip in the plurality of supporting strips, and the filling strips and the supporting strips corresponding to each other are detachably connected.

7. The carrying device of claim 6,
wherein the upper surface of the supporting platform is provided with a first opening, the plurality of supporting strips further include other supporting strips, the first supporting strip, the second supporting strips and other supporting strips are arranged in series to form a second opening, and the second opening is located in an area of the first opening.

8. The carrying device of claim 7, further comprising:
a supporting block that is disposed at a bottom of the supporting platform and located inside the second opening, an upper surface of the supporting block being located in the same plane as the upper surfaces of the plurality of supporting strips.

9. The carrying device of claim 8,
wherein the upper surfaces of the plurality of supporting strips and the upper surface of the supporting block are inclined surfaces.

10. The carrying device of claim 9,
wherein the inclined surfaces have an included angle of about 20° to 30° with respect to a horizontal plane.

11. The carrying device of claim 8,
wherein the bottom of the supporting platform is provided with a plurality of positioning holes configured to be detachably connected to the supporting block.

12. The carrying device of claim 8,
wherein the bottom of the supporting platform is provided with a guide rail along which the supporting block can slide.

13. The carrying device of claim 2,
wherein a first groove and a second groove are formed at the bottom of the supporting platform, the first groove is parallel to the first and second guide rails and configured to accommodate an air pipe connected to a suction cup on the first supporting strip, and the second groove is parallel to the third and fourth guide rails and configured to accommodate an air pipe connected to a suction cup on the second supporting strip.

* * * * *